J. C. BATES.
VENTILATING APPARATUS FOR CARS, DWELLINGS, &c.
No. 185,474. Patented Dec. 19, 1876.
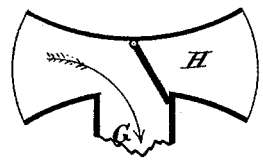
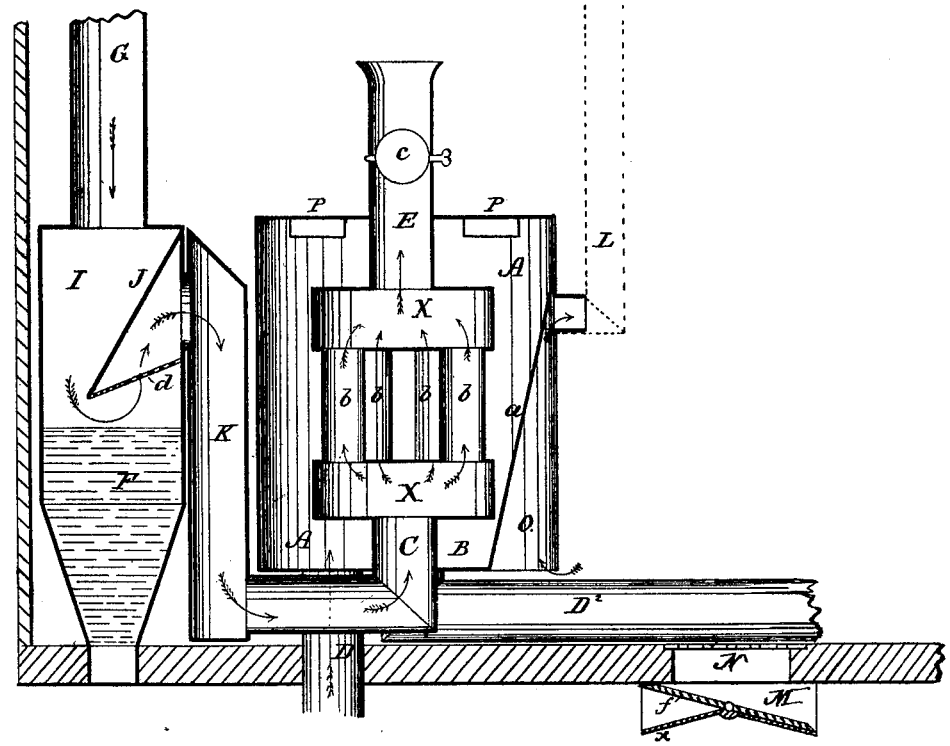
Fig. 1.
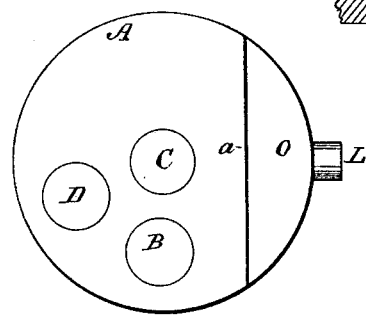
Fig. 2. Fig. 3.
WITNESSES:
W. W. Hollingsworth
Chas. A. Pettit
INVENTOR:
Jno. C. Bates
BY
ATTORNEYS.
THE GRAPHIC CO. N.Y.

UNITED STATES PATENT OFFICE.

JOHN C. BATES, OF COLD SPRING, NEW YORK.

IMPROVEMENT IN VENTILATING APPARATUS FOR CARS, DWELLINGS, &c.

Specification forming part of Letters Patent No. 185,474, dated December 19, 1876; application filed May 18, 1876.

*To all whom it may concern:*

Be it known that I, JOHN C. BATES, of Cold Spring, in the county of Putnam and State of New York, have invented a new and Improved Ventilating Apparatus for Cars, Dwellings, &c.; and I do hereby declare that the following is a full, clear, and exact description of the same, reference being had to the accompanying drawing, forming part of this specification, in which—

Figure 1 is a vertical section; Fig. 2, a bottom view of drum; Fig. 3, a detail of the floor-register.

My invention relates to an improved ventilating apparatus specially designed for railway-cars, but applicable to, and intended for, buildings also.

It consists in the construction and arrangement of parts in which an inlet-pipe for the air leading from the top of the car carries, from the motion of the car, a current of air down into a cylinder having a deflector and water-trap to eliminate the cinders, the air passing from thence through an externally-heated drum into the car. The said drum is constructed with end chambers connected by tubes, and is located in a containing-case, into which hot air is admitted from a heater below the car, and from which it is drawn by a pipe terminating in the open air, a chamber being formed in the containing-case of the ventilator, which connects with a pipe leading to the top of the car, which receives the impure air from the bottom of the car, and discharges the same in accordance with the law of convection.

In the drawing, D is the hot-air pipe, leading from the heater, which pipe passes through a hole in the floor under the ventilator, and communicates with the containing-case A, for the purpose of heating the ventilating-drum. The hot air circulates through the case A, and passes out at hole B, which can be connected with pipe D², running the entire length of the car, and having an exit at the end in a pipe passing through the top of the car. Fig. 2, which represents the bottom of the case A, shows the entrance D for hot air; B, the exit for hot air; C, the entrance for fresh air, communicating with the drum; and O, the opening for foul air to be carried off from near the bottom of the car, which opening consists of a chamber formed in the case A by a partition, *a*. The ventilating-drum has two cylindrical chambers, X X, connected by pipes or tubes *b*. The fresh air enters at C, passes into the bottom chamber, and through the pipes into the top chamber, and out through pipe E into the car or apartment, the said arrangement of the drum serving to rapidly and thoroughly heat the air in its passage through. This pipe E has a damper or valve, *c*, to regulate the quantity of air admitted. In summer, instead of having the drum heated, the case A may be charged with ice to cool the air as it is introduced into the car. Fresh warm air is thus supplied in winter, and fresh cool air in the summer, free from dust and cinders, and without being made impure by its passage over the heater. The fresh air is admitted through an opening at the end of the car through the hood H into the pipe G, which hood is open at both ends, and is fitted with an automatic valve hung in the center, so as to open fully when the car is going in either direction. The fresh air passes down pipe G into the cylinder I, the lower part of which may be filled with water, as at F, and provided with a valve at the bottom to let out the water and accumulated dirt. As the air passes down, it strikes the deflector J, and the cinders and dirt are thrown into the water-trap, while the more or less purified air, taking the direction of the arrows, passes through one or more wire sieves, *d*, into pipe K, and down this pipe into the ventilating-drum. This cylinder I and pipe G can, if desired, be inclosed in the containing-case A with the ventilating-drum, or for a summer ventilator can be used without the drum. The drum can be of any shape, and when the hot air is not admitted into the car or apartment through a register, but a stove is used for heating, the drum can be made to fit partly around the same. The drum may be also heated by gas or a steam-coil.

The car being thus supplied with fresh heated air, the foul air near the bottom of the car enters the chamber O, and, being heated, passes up and out by pipe L into the smoke-flue, or up through the top of the car.

When used for heating a building, the fresh-air pipe can be brought under the floor, up the chimney, or otherwise, and the hot air, after heating one room, can be carried to another drum on the floor above, the pipes being arranged to pass through the chimney.

The cylinders I can be used with or without water, and when water is not used additional sieves should be put in to catch the cinders; but I prefer using water for summer.

To facilitate the removal of the impure air from the car, I have arranged two or more registers, N, provided with exhaust-hood M underneath the car. These hoods have flanged edges with a valve or gate, $f$, pivoted in the center, so as to open different ends of the hood, according to the direction in which the car is moving. These valves are to be worked either automatically, as shown, or by hand, or are connected with the running-gear of the car, so as to have the closed end pointing to the front of the car, thereby producing a partial vacuum in the rear that draws the impure air from the car. P are evaporating-pans, located upon the top of the case A, which are adapted to receive water, and impart a healthful amount of moisture to the air.

By means of my invention, as thus described, I produce a complete ventilator, and am enabled to supply a car or apartment with pure air without draft, dust, or cinders, cool or warmed, as may be desired, and which can be regulated at will.

Having thus described my invention, what I claim as new is—

1. The cylinder I, adapted to receive water, and having an outlet at the bottom with a deflector, J, and sieve $d$, in combination with pipes G and K, substantially as and for the purpose described.

2. The combination of cylinder I, having deflector J and sieve $d$, with the pipes G and K, the drum composed of chambers X X, connected by tubes $b$, and terminating in a pipe, E, and the containing-case A, having a circulation of hot air from a heater, substantially as and for the purpose described.

3. The combination, with the fresh-air ventilating devices, of the outer case A, having a partition, $a$, forming a chamber-opening at the bottom in the car, and through a pipe upon the outside of the car, substantially as and for the purpose described.

4. The combination, with the car, of the registers N and the hoods M, having flanged edges, with a valve, $f$, pivoted in the middle, so as to be reversed, substantially as and for the purpose described.

JOHN C. BATES.

Witnesses:
J. PLANKINTON,
W. J. FLOYD.